United States Patent

[11] 3,617,110

[72] Inventor Bernard Louis Yves Dubuisson
Paris, France
[21] Appl. No. 840,066
[22] Filed July 8, 1969
[45] Patented Nov. 2, 1971
[73] Assignee Societe Francaise D'Optique Et De
Mecanique S.F.O.M.
a part interest

[54] SPACE SIMULATORS
4 Claims, 1 Drawing Fig.
[52] U.S. Cl. ....................................... 350/136,
33/20 D, 356/2
[51] Int. Cl. ...................................... G01c 11/12
[50] Field of Search .......................... 350/136;
33/1, 20 D; 356/2

[56] References Cited
UNITED STATES PATENTS
1,858,353  5/1932  Aldis ........................... 350/136 X
2,125,553  8/1938  Fourcade ...................... 33/20 D
2,263,971  11/1941  King et al ..................... 33/20 D
2,803,992  8/1957  Baboz ........................... 350/136 X Primary Examiner—David Schonberg
Assistant Examiner—Paul A. Sacher
Attorney—Waters, Roditi, Schwartz & Nissen ABSTRACT: Space simulator comprising two chambers carrying a stereoscopic photopair, two light sources carried by a stand and emitting two beams projecting on the two photographs of the photopair the images of the marks, and a stereoscoping viewing device for viewing the two beams. The marks are arranged so that they can be moved exclusively in a stationary plane $P_1$ conjugated relatively to the lenses of the chambers with a plane $P_2$ corresponding to the mean position of the photopair.

PATENTED NOV 2 1971  3,617,110
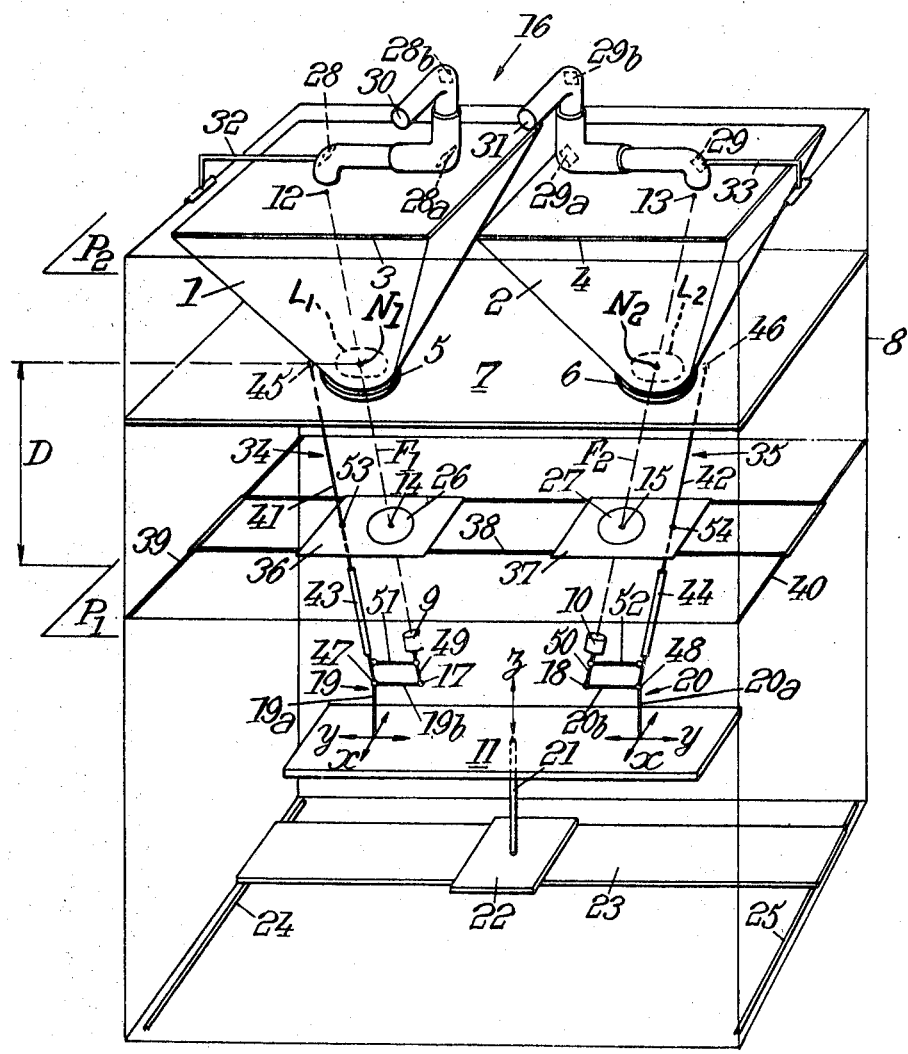

SPACE SIMULATORS

The invention relates to space simulators of the type comprising:

two chambers in which a stereoscopic photopair are mounted and which have lenses and which are mounted in a frame;

two light sources which are mounted on a stand movable relatively to the frame and each adapted to emit a beam projecting on the photopair the images of marks disposed between the sources and the lenses, and a stereoscopic viewing device for viewing the beams which have passed through the photopair, the whole being such that for each part of the subject under observation the photopair and the beams are in positions similar to the positions which the photopair and the beams from the particular part of the subject concerned were in when the photopair was photographed.

Of course, a viewer having a stereoscopic view of the beams sees the images of the marks on the photopair as a single space mark, which enables the viewer to align each observed part of the subject by so adjusting the position of the movable stand that the single space mark coincides with the particular part of the subject concerned.

Space simulators are known wherein marks, e.g., in the form of a transparent zone formed in an opaque sheet (or of an opaque zone formed in a transparent sheet) are maintained on the path of the beams at a constant distance from the exterior nodal points of the lenses through the agency of supports which are articulated around such nodal points and which are guided by the movable stand. When the viewer moves the stand for alignment purposes the marks move along spherical caps centered on the exterior nodal points, and the images which the lenses form of the marks are contained in aplanar surfaces. Since the photopair is flat, the mark images formed on the photopair by the lenses are not sharp for all possible positions of the stand.

In another known kind of space simulator, the marks are disposed at a constant distance from the light sources mounted on the movable stand; when the viewer makes aligning adjustments, he moves the stand along a surface similar to the surface of the photographed subject, and so the marks also move along such similar surface. When, e.g., in the case of aerial photographs of mountainous terrain, the subject surface has considerable relief, the images which the lenses form of the marks are contained in aplanar surfaces and, as in the case just described, the images which the lenses form of the marks on the photographs are not sharp for all possible stand positions.

In both cases the space mark may be imaged other than sharply when aligned with some of the observed parts of the subject, with consequent inaccuracies in (graphical or photographic) plotting which, of course, is based on reproducing the movements of the stand.

It is a main aim of this invention so to devise space simulators of the kind concerned that the space mark is always imaged sharply enough for the viewer to align all the viewed parts of the subject sharply.

According to a main feature of a space simulator according to the invention, the marks are adapted for movement exclusively in a stationary plane which is conjugated relatively to the lenses with a plane corresponding to the mean position of the photopair.

In a space simulator in which the chambers are articulated to the frame so that the exterior nodal points of the lenses remain stationary relatively to the frame, the stationary plane in which the marks move is at such a distance from the exterior nodal points of the lenses that the images of the marks as given by the lenses appear sharply on the photopair.

The invention can in any case be readily understood from the remainder of the description, given hereinafter, and from the accompanying drawing, which relate to one embodiment of the invention.

The single FIG. which forms the drawing is an axionometric perspective view of a space simulator according to the invention.

To devise a space simulator particularly intended for plotting stereoscopic aerial photopairs, the following or similar steps are taken.

All that will be described hereinafter are the elements required for an understanding of the invention; more particularly, no description will be made of the (graphic or photographic) plotting device which processes the movements of the movable stand of the simulator.

The simulator as a whole and in known manner comprises:

two chambers 1, 2 in which the two photographs 3, 4 forming a stereoscopic photopair are respectively mounted and which have lenses $L_1L_2$ and which are mounted in a frame 8;

two light sources 9, 10 which are mounted on a base plate or stand 11 movable relatively to the frame 8 and which are adapted respectively to emit two beams $F_1F_2$ projecting on the photopair 3, 4 the images 12, 13 of marks 14, 15 disposed between the sources 9, 10 and the lenses $L_1$, $L_2$ of the chambers 1 and 2; and a stereoscopic viewing device 16 for viewing the beams $F_1$, $F_2$ which have passed through the photopair.

The whole is such that for each part of the subject under observation the photopair 3, 4 and the beams $F_1$, $F_2$ are in positions similar to the positions which the photopair 3, 4 and the beams from the particular part of the subject concerned were in when the photopair was photographed.

The light sources 9, 10 are pivotally mounted by means of swivels 17, 18 on supports 19, 20 each in the form of a L-shaped rod having a vertical portion 19a, 20a and a horizontal portion 19b, 20b, the supports 19, 20 being mounted on stand 11. Known means (not shown), e.g., slideways on the stand 11, can be used to adjust the positions of the supports 19, 20 on the stand 11 in horizontal directions $x$, $y$ which are perpendicular to one another. Each light source 9, 10 is embodied by a lamp (not shown) associated with a reflector and with a condenser, the light source being adapted to emit a light beam $F_1$, $F_2$ whose focusing zone is disposed near the marks 14, 15.

Stand 11 is mounted on a vertical support member 21 whose length in a vertical direction $z$ perpendicular to the directions $x$ and $y$ can be adjusted. Member 21 is mounted on a slider 22 slidable in the direction $y$ on a slide 23 mounted on rails 24, 25 rigidly secured to frame 8 so as to be slidable in the direction $x$.

The marks 14, 15 take the form e.g., of transparent zones in opaque surfaces 26, 27 or alternatively of opaque zones in transparent surfaces.

The known stereoscopic viewing device 16 comprises a stereoscope having mirrors 28, 28a, 28b and 29, 29a, 29b adapted to direct to eyepieces 30, 31 and beams $F_1$, $F_2$ which have passed through the photographs 3, 4. The stereoscope is mounted in slideways 32, 33 and can therefore be moved to enable the whole subject of the photopair to be viewed.

So that the photopair 3, 4 and the beams $F_1$, $F_2$ may, for each viewed portion of the subject, be in positions similar to the positions which such photographs and the beams issuing from the particular part of the subject concerned were in when the photographs 3, 4 were taken, it is known in this art to adjust the positions of the chambers 1, 2 relatively to the frame 8 and the positions of the light sources 9, 10 relatively to the stand 11. This adjusting operation will not be described in detail but it may help in an understanding of the invention to know that the photographs 3, 4 are placed in positions corresponding to the positions in which they were taken. Consequently, in the case of aerial photography of terrain made in horizontal flight, the photographs 3, 4 are horizontal and, as the drawing shows, disposed in a horizontal plane $P_2$ in the simulator.

The plane $P_2$ forms the pane corresponding to the mean position of the photopair 3, 4, to be discussed hereinafter. Depending upon shooting conditions, the photopair 3, 4 may need to be placed in positions such that perpendiculars to the photopair form with the perpendicular to such plane a small angle which in most cases does not exceed 5°.

Continuing now from the known features hereinbefore described, the space simulator according to the invention is mainly distinguished in that the marks 14, 15 are adapted for movement exclusively in a stationary plane $P_1$ which is conjugated relatively to the lenses $L_1$, $L_2$ of the chambers 1, 2 with a plane $P_2$ corresponding to the mean position of the photopair 3, 4.

In the commonest case in which, so that the photopair 3, 4 can be adjusted, the chambers 1, 2 are articulated, e.g., via universal joints 5, 6 to a plate 7 rigidly secured to frame 8, so that the exterior nodal points $N_1$, $N_2$ of the lenses are stationary relatively to the frame 8 and are disposed e.g., in the plane of the plate 7, the stationary plane $P_1$ is at such a distance D from the exterior nodal points $N_1$, $N_2$ of the lenses that the images 12, 13 of the marks 14, 15 as given by the lenses $L_1$, $L_2$ appear sharply on the photopair 3, 4.

Advantageously, a mechanical connection 34, 35 between each light source 9, 10 and the frame 8 is adapted, whichever part of the subject is being observed, to direct the beams $F_1$, $F_2$ from the source 9, 10 towards the exterior nodal point $N_1$, $N_2$ of the corresponding lenses $L_1$, $L_2$ and to maintain the corresponding mark 14 or 15 on the path of such beam $F_1$, $F_2$.

Advantageously, the marks 14, 15 are mounted on sliders 36, 37 slidable in a first direction $y$ on a frame member 38 so mounted on rails 39, 40 rigidly secured to the frame 8 as to be slidable in the direction $x$ in the plane $P_1$.

Advantageously, each mechanical connection 34, 35 comprises a rod 41, 42 comprising a telescopic part 43, 44 and disposed, whichever part of the subject is being viewed, parallel to the beams $F_1$ and $F_2$ respectively; for this, the rods 41, 42 are articulated at their top ends to the plate 7 via swivels 45, 46, while their bottom ends are articulated to the supports 19, 20 by swivels 47, 48 disposed at those ends of the parts 19b, 20b which are adjacent the parts 19a, 20a.

Also, the sources 9, 10 are mounted on arms 49, 50 which are disposed in extension of the beams $F_1$, $F_2$ and which are articulated to the supports 19, 20 by swivels 17, 18 disposed at those ends of the parts 19b, 20b which are remote from the parts 19a, 20a. Rods 51, 52 whose lengths are equal to the lengths of the horizontal parts 19b, 20b of the supports 19, 20 are disposed parallel to the last-mentioned parts 19b, 20b and are articulated to the rod 41 and arm 49 and to the rod 42 and arm 50, respectively, so that the configurations bounded by the rod 41, part 19b, arm 49 and rod 51, and by the rod 42, part 20b, arm 50 and rod 52, are each a parallelogram remaining in the plane defined by the rod 41 and the beam $F_1$, or by the rod 42 and the beam $F_2$, whichever part of the subject is being viewed.

The rods 41, 42 extend slidingly through apertures 53, 54 in the sliders 36, 37. The distances between the swivel 45 and the nodal point $N_1$, the aperture 53 and the mark 14 and the swivels 47 and 17 are equal and constant, whichever part of the subject is being viewed. Also, the distances between the swivel 46 and the nodal point $N_2$, the aperture 54 and the mark 15 and the swivels 48 and 18 are equal and constant, whichever part of the subject is being viewed.

In plotting, the viewer moves the stand 11 in the directions $x$, $y$ and $z$ so that for each part of the subject being viewed, the space mark and the part of the subject being concerned, as projected by the beams $F_1$, $F_2$, coincide with one another.

As will be apparent, the images 12, 13 of the marks 14, 15 always appear sharply in the plane $P_2$ corresponding to the mean position of the photopair 3, 4 even if the stand 11 moves considerably in the direction $z$, as is the case when plotting a subject with considerable relief.

When the perpendiculars to the photopair 3, 4 form a small angle with the perpendicular to the plane $P_2$, the images 12, 13 still remain sharp for, as is known in this art, the lenses $L_1$, $L_2$ of the chambers 1, 2 have a very small aperture, and so the depth of field of such lenses is enough to project a sharp image of the marks 14, 15 on planes differing slightly from the plane $P_2$.

Clearly, the invention is not limited to the particular embodiment which has been more particularly considered; many modifications are possible.

What is claimed is:

1. In a space simulator comprising:
    a stereoscopic viewing device for observing a pair of stereoscopic photographs so as to enable photogrammetric plotting means to locate the viewed subject in the photographs, said subject being sighted by reference marks illuminated by lighting means and whose image is formed on said photographs, an assembly comprising:
    a frame,
    a pair of chambers mounted pivotably on said frame and each providing a support for one of said photographs, so that said photographs lie substantially in a first plane,
    a pair of lens systems, each lens system being mounted in a respective said chamber with its optical axis substantially perpendicular to said first plane, said lens systems having nodal points located in substantially a common second plane spaced from said first plane and at right angles to said optical axes,
    means for pivoting said chambers about their respective nodal points,
    a pair of elements bearing reference marks and means for movably mounting said elements on the frame in a third plane optically conjugate and parallel, with respect to said first plane, and spaced from said second plane
    a baseplate mounted in the frame on the side of said third plane remote from said second plane,
    a pair of swivels fixed in said second plane,
    a pair of mechanical linkages coupling predetermined points on said baseplate respectively to said swivels,
    each said element being slidably traversed by a said respective mechanical linkage,
    each said mechanical linkage including a telescopic element connected to a respective swivel so as to be parallel always to the straight line from its respective reference mark to the nodal point of its corresponding lens system, and
    means for adjusting the position of said baseplate in three dimensions,
    whereby movement of said baseplate effects corresponding adjustment of said elements in said third plane.

2. A simulator as set forth in claim 1, comprising sliders slidable in a first direction parallel to said first plane, and a member slidably supporting said sliders and so mounted in the frame as to be in turn slidable in a second direction perpendicular to said first direction and parallel to said first plane, said elements being borne by said sliders.

3. A simulator as set forth in claim 2, wherein each said telescopic element comprises a rod, the lighting means comprising a corresponding light source for each chamber, and a parallelogram linkage connecting each light source to a respective rod so that the beam from said light source is substantially parallel to said telescopic rod, the telescopic rod extending slidably through an aperture provided in the corresponding element.

4. A simulator as set forth in claim 1, wherein said means for adjusting the position of said baseplate comprises a vertical support member of adjustable length, a horizontal slide supporting said vertical support member, and rails on said frame extending perpendicular to said slide and movably supporting the same.

* * * * *